(12) United States Patent
Yano

(10) Patent No.: US 7,372,534 B2
(45) Date of Patent: May 13, 2008

(54) LIGHT ADJUSTER WITH ELECTRICALLY CONDUCTIVE TAPE STUCK ON ELECTRICALLY CONDUCTIVE CYLINDRICAL HOUSING IN WHICH IS ACCOMMODATED PART OF WIRING

(75) Inventor: Yuichi Yano, Ichihara (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 297 days.

(21) Appl. No.: 11/118,248

(22) Filed: Apr. 28, 2005

(65) Prior Publication Data

US 2005/0190331 A1 Sep. 1, 2005

(30) Foreign Application Priority Data

Jul. 30, 2003 (JP) ............... 2003-203468

(51) Int. Cl.
*G02F 1/1345* (2006.01)
(52) U.S. Cl. .............. 349/150; 349/86; 349/149; 349/152
(58) Field of Classification Search .............. 349/16, 349/150, 152
See application file for complete search history.

(56) References Cited

U.S. PATENT DOCUMENTS

| 4,749,261 | A | * | 6/1988 | McLaughlin et al. | .......... 349/16 |
| 6,055,088 | A | | 4/2000 | Fix et al. | |
| 6,160,655 | A | | 12/2000 | Fix et al. | |
| 6,334,798 | B1 | * | 1/2002 | Ushijima et al. | ........... 439/879 |
| 2002/0061688 | A1 | * | 5/2002 | Hanazaki et al. | ........... 439/877 |

FOREIGN PATENT DOCUMENTS

| EP | 0 461 002 | 12/1995 |
| JP | S49-24688 | 7/1974 |
| JP | S51-77879 | 7/1976 |

(Continued)

OTHER PUBLICATIONS

Machine translation of Ito et al., Japanese Patent Document 06-82810 (Mar. 25, 1994).*

(Continued)

*Primary Examiner*—Andrew Schechter
(74) *Attorney, Agent, or Firm*—Cohen Pontani Lieberman & Pavane LLP

(57) ABSTRACT

There is provided a light adjuster and a laminated glass which are capable of reducing labor time while inhibiting formation of cadmium and preventing degradation of the liquid crystal layer. A light adjuster 103 is comprised of a pair of PET films 109a and 109b that sandwich a liquid crystal layer 108 therebetween, transparent electrically conductive films 110a and 110b that are provided on respective facing surfaces of the pair of PET films 109a and 109b, and an electrode structure provided at one end of the light adjuster 103. The electrode structure is comprised of a silver paste 111 that is applied to an exposed part of the transparent electrically conductive film 110b, a metallic layer 112 formed of a copper tape that is stuck on the upper surface of the silver paste 111, and a connector 113 formed of a copper tape that is connected to the metallic layer 112. Further, the connector 113 is stuck on a sleeve 115 that accommodates a lead line 114 that supplies power from an external power source, not shown.

5 Claims, 3 Drawing Sheets

FOREIGN PATENT DOCUMENTS

| | | |
|---|---|---|
| JP | 58-501631 | 9/1983 |
| JP | 64-49923 U | 3/1989 |
| JP | 2-62517 U | 5/1990 |
| JP | 2-62518 U | 5/1990 |
| JP | H02-62518 | 5/1990 |
| JP | H04-229585 | 8/1992 |
| JP | 4-116827 U | 10/1992 |
| JP | H04-116827 | 10/1992 |
| JP | 06-082810 A | 3/1994 |
| JP | H06-73868 | 10/1994 |
| WO | WO 83/01016 | 3/1983 |

OTHER PUBLICATIONS

Search Report dated Jul. 26, 2006 for the corresponding European Application No. EP 04 74 8245.

* cited by examiner

PRIOR ART

PRIOR ART

LIGHT ADJUSTER WITH ELECTRICALLY CONDUCTIVE TAPE STUCK ON ELECTRICALLY CONDUCTIVE CYLINDRICAL HOUSING IN WHICH IS ACCOMMODATED PART OF WIRING

TECHNICAL FIELD

The present invention relates to a light adjuster and a laminated glass having a liquid crystal material therein, and in particular relates to a light adjuster and a laminated glass that enables visual field control.

BACKGROUND ART

Hitherto, electrochromic devices (hereinafter referred to as "EC devices") have been known as devices such as light adjusters having a light adjusting capability of enabling the transmissivity to be freely adjusted (hereinafter referred to as "light adjusting devices"). Such an EC device is, for example, made from a material that undergoes a spectral change upon an electrochemical redox reaction, such as tungsten oxide or prussian blue, and controls the transmitted light by absorbing light. However, because such an EC device is current driven, if the EC device is made to have a large area, then a large voltage drop arises, the response speed drops markedly, and degradation of constituent materials due to electrochemical changes and so on occurs during prolonged passing of a current; such an EC device thus cannot be used as a light adjuster that is required to be durable.

In recent years, voltage driven light adjusting devices have thus been used in a laminated glass instead of such current driven EC devices. For example, nematic curvilinear aligned phase (NCAP) liquid crystal light adjusters are known as such voltage driven light adjusting devices. Such a nematic liquid crystal light adjuster is made from a liquid crystal material, and has excellent durability, and can easily be made to have a large area (see, for example, Japanese Laid-Open Patent Publication (Kohyo) No. S58-501631).

As shown in FIG. 2, in general, such a light adjuster 20 is comprised of a liquid crystal layer 23 having a light adjusting function in which a plurality of voids 21 are filled with nematic liquid crystalline rod-like molecules (hereinafter referred to as "liquid crystal molecules") 22, and a pair of PET films 24 that sandwich the liquid crystal layer 23 therebetween; transparent electrically conductive films 25 are provided on facing surfaces of the PET films 24 so as to be bonded to the liquid crystal layer 23, and a voltage is applied to the liquid crystal layer 23 via this pair of transparent electrically conductive films 25. The liquid crystal layer 23 is formed of a transparent polymer film 26 having a plurality of voids 21 therein, and each void 21 is filled with liquid crystal molecules 22 so as to form a liquid crystal capsule 27.

According to this light adjuster 20, when a voltage is not being applied, the liquid crystal molecules 22 line up along the curved wall surfaces of the liquid crystal capsules 27, and are thus not arranged along the direction of travel of light transmitted through the liquid crystal capsules 27; the optical path of the transmitted light thus meanders around, and incident light is scattered at boundary layers between the liquid crystal capsules 27 and the polymer film 26, and hence the liquid crystal layer 23 becomes cloudy. On the other hand, when a voltage is applied, the liquid crystal molecules 22 line up along the direction of the electric field produced. At this time, if the liquid crystal layer 23 is made from a material such that the ordinary refractive index $n_o$ of the liquid crystal molecules 22 matches the refractive index $n_p$ of the polymer film 26, it becomes such that boundary layers between the liquid crystal capsules 27 and the polymer film 26 do not exist optically, and hence light incident on the liquid crystal layer 23 can be transmitted unhindered, whereby the liquid crystal layer 23 becomes transparent.

Due to the above principle, the light adjuster 20 has a visual field controlling capability of shutting off the visual field through scattering of incident light when a voltage is not being applied, and securing the visual field through allowing incident light to be transmitted unhindered when a voltage is being applied. A laminated glass using such a light adjuster is employed in show windows or the like, as a laminated glass having a visual field controlling capability.

FIG. 3 is a sectional view of the schematic construction of a laminated glass using the light adjuster in FIG. 2.

In FIG. 3, a laminated glass 30 is comprised of a pair of glass sheets 31a and 31b that are disposed in facing relation to each other, transparent intermediate layers 32a and 32b provided on respective facing surfaces of the glass sheets 31a and 31b, and the light adjuster 20 that is sandwiched between the intermediate layers 32a and 32b. The light adjuster 20 has an electrode structure, described below, which is provided on a part of the transparent electrically conductive film 25b which is exposed with the liquid crystal layer 23, the transparent electrically conductive film 25a, and the PET film 24a being partially cut off.

This electrode structure includes a connecting base formed of a silver paste 33 that is applied to the exposed part of the transparent electrically conductive film 25b, and a copper tape 34 that is stuck on the upper surface of the silver paste 33, and a connector 35 in the form of a strip formed of a metallic mesh that is interposed between the copper tape 34 and the intermediate layer 32a and is soaked with solder. With the soaked solder being melted, the connector 35 becomes secured at one end thereof to the copper tape 34, and the other end becomes secured to the lead line 36 that supplies power from an external power source.

With the light adjuster 30, a part of the connector 35 is made to protrude from the periphery of the laminated glass 30 in order to secure connection of the connector 35 and the lead line 36. The part which protrudes, however, can freely bend and will not interfere with other parts. Therefore, the handleability of the laminated glass using the light adjuster can be improved.

However, in the above-described electrode structure, the connecting base and the connector 35 are formed of separate members. Consequently, the structure is complex, and there arises a problem that the labor time required to prepare the light adjuster 20 becomes extensive.

Further, since the connector 35 is soaked with solder, there is a possibility that cadmium is produced, which triggers environmental problems. In addition, since the connector 35 is secured to the copper tape 34 and its adjacent parts when the soaked solder is melt, it becomes necessary to heat the light adjuster 20, which causes a problem that the liquid crystal layer 23 of the light adjuster 20 degrades due to the heating.

The present invention has been devised in view of the above-described problems, and it is an object of the present invention to provide a light adjuster and a laminated glass which are capable of reducing labor time while suppressing production of cadmium and preventing degradation of the liquid crystal layer.

DISCLOSURE OF THE INVENTION

To attain the above object, in a first aspect of the present invention, there is provided a light adjuster including a liquid crystal layer having a plurality of voids therein, each of the voids being filled with a liquid crystal material, a pair of substrates that sandwich the liquid crystal layer therebetween, at least one of the substrates being transparent, transparent electrically conductive films provided on respective facing surfaces of the substrates, and an electrode structure formed of a connecting part connected to wiring that supplies power from outside, characterized in that the connecting part is formed of an electrically conductive tape.

In this aspect, preferably the electrode structure further comprises a connecting base that is interposed between the connecting part and one of the transparent electrically conductive films, and the connecting base includes a metallic layer that is formed of the electrically conductive tape.

In this aspect, preferably a part of the wiring that connects to the electrically conductive tape is accommodated in an electrically conductive cylindrical housing.

To attain the above object, in a second aspect of the present invention, there is provided a light laminated glass including a pair of glass sheets disposed in facing relation to each other, intermediate layers provided on respective facing surfaces of the pair of glass sheets, and a light adjuster sandwiched between the intermediate layers, characterized in that the light adjuster comprises a liquid crystal layer having a plurality of voids therein, each of the voids being filled with a liquid crystal material, a pair of substrates that sandwich the liquid crystal layer therebetween, at least one of the substrates being transparent, transparent electrically conductive films provided on respective facing surfaces of the substrates, and an electrode structure formed of a connecting part connected to wiring that supplies power from outside, and the connecting base is formed of an electrically conductive tape, and a part of the wiring that connects to the electrically conductive tape is accommodated in an electrically conductive cylindrical housing.

BEST MODE FOR CARRYING OUT THE INVENTION

A light adjuster according to an embodiment of the present invention will now be described with reference to the drawings.

Figure 1:
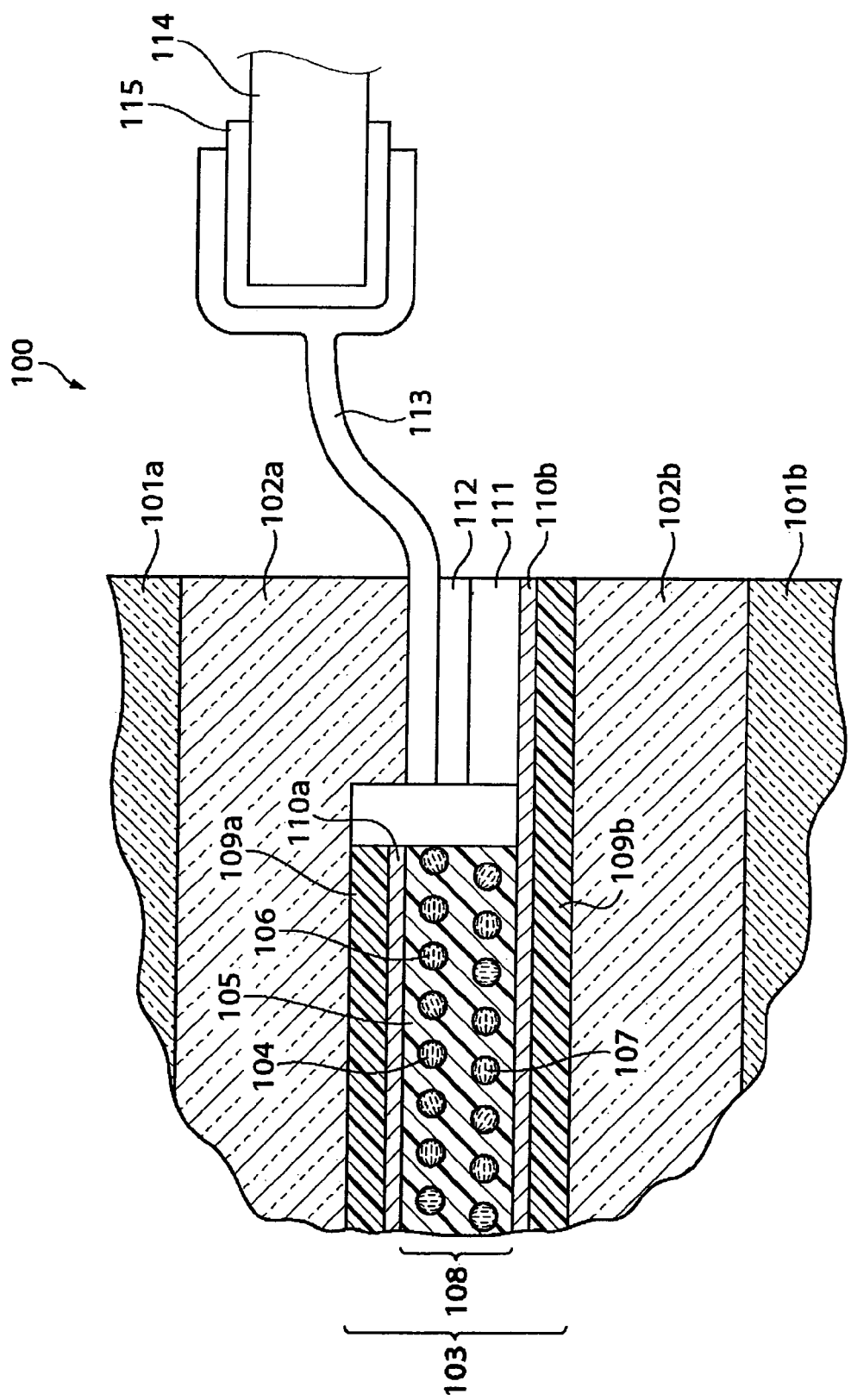
FIG. 1 is a sectional view of the schematic construction of a laminated glass using a light adjuster according to an embodiment of the present invention.
Figure 2:
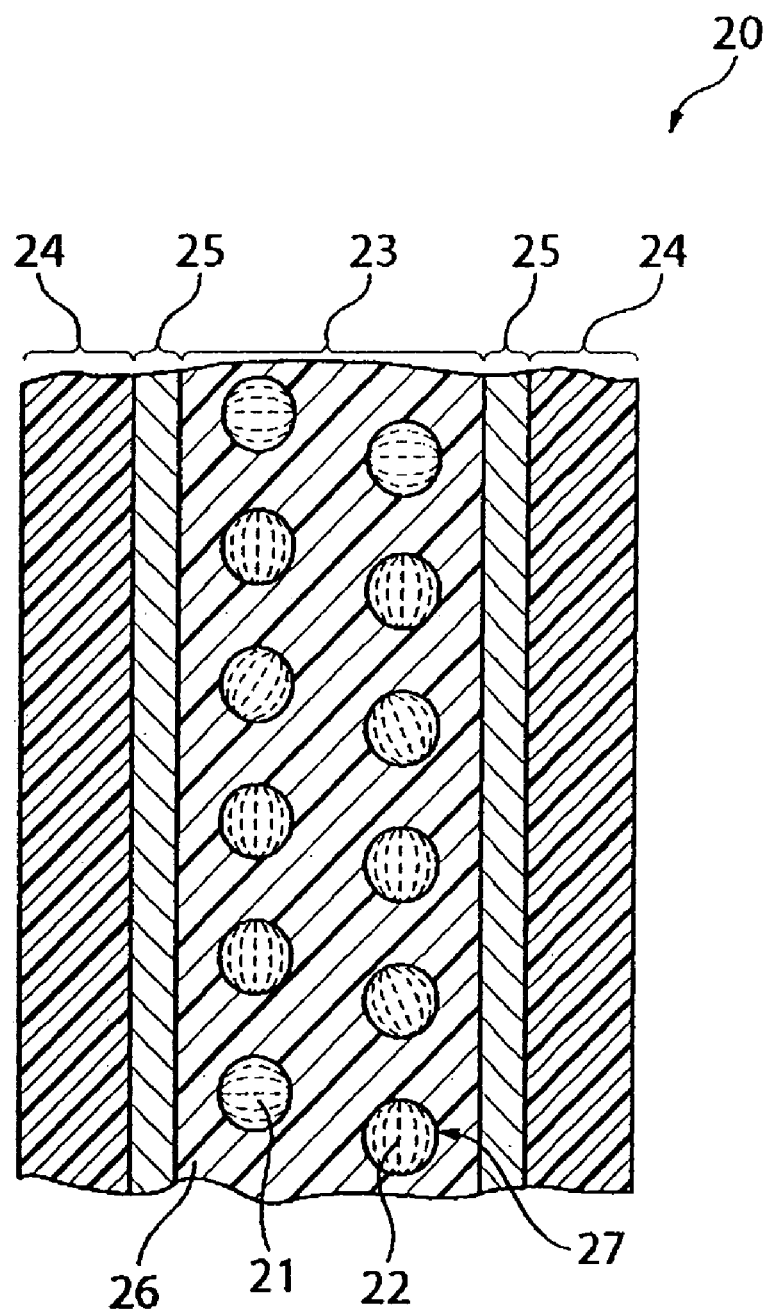
FIG. 2 is a sectional view of the schematic construction of a conventional light adjuster.
Figure 3:
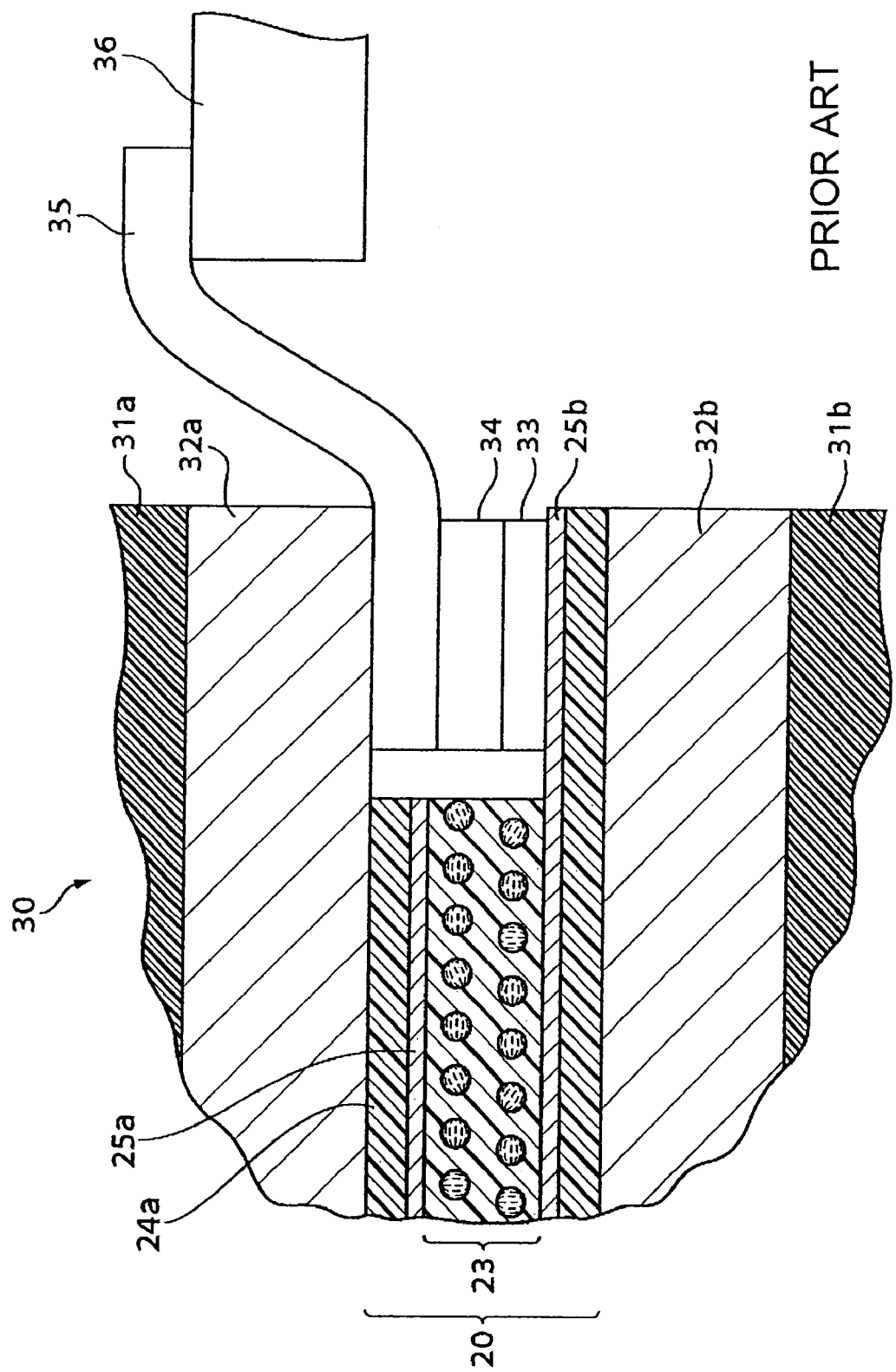
FIG. 3 is a sectional view of the schematic construction of a laminated glass using the light adjuster in FIG. 2.

FIG. 1 is a sectional view of the schematic construction of a laminated glass using the light adjuster according to the embodiment of the present invention.

In FIG. 1, the laminated glass 100 is comprised of a pair of glass sheets 101a and 101b that are disposed in facing relation to each other, transparent intermediate layers 102a and 102b provided on respective facing surfaces of the glass sheets 101a and 101b that are formed of, for example, EVA (copolymer of ethylene vinyl acetate), and a light adjuster 103, described below, that is sandwiched between the intermediate layers 102a and 102b.

The light adjuster 103 is comprised of a liquid crystal layer 108 formed of a transparent polymer film 105 made of a latex having a plurality of voids 104 therein, and liquid crystal capsules 107 formed of liquid crystal molecules 106 being filled in the voids 104, a pair of PET films (substrates) 109a and 109b that sandwich the liquid crystal layer 108 therebetween, and transparent electrically conductive films 110a and 110b that are provided on respective facing surfaces of the pair of PET films 109a and 109b. Further provided at one end of the light adjuster 103 is an electrode structure, described below, which is provided on a part of the transparent electrically conductive film 110b which is exposed with the liquid crystal layer 108, the transparent electrically conductive film 110a, and the PET film 109a being partially cut off.

The electrode structure is comprised of a connecting base formed of a silver paste 111 that is applied to the exposed part of the transparent electrically conductive film 110b at one end of the light adjuster 103, and a metallic layer 112 that is stuck on the upper surface of the silver paste 111, and a connector (connecting part) 113 formed of a copper tape that is interposed between the metallic layer 112 and the intermediate layer 102a. One end of the connector 113 is stuck on the metallic layer 112, and the other end is stuck on a sleeve 115, described later, which accommodates a lead line 114 that supplies power from an external power source, not shown.

The metallic layer 112 is formed of a copper tape, and an end of the lead line 114 is accommodated in the cylindrical sleeve 115 which is made of a metal. The connector 113 that is stuck on the sleeve 115, the sleeve 115, and the lead line 114 are caulked together.

Further, the light adjuster 103 includes a similar electrode structure, not shown, that is provided on an exposed part of the transparent electrically conductive film 110a at the other end of the light adjuster 103.

With the light adjuster 103, power supplied by the lead line 114 is transmitted to the transparent electrically conductive films 110a and 110b via the sleeve 115, the connector 113, the metallic layer 112, and the silver paste 111, and the transparent electrically conductive films 110a and 110b apply voltage to the liquid crystal layer 108.

According to the light adjuster 103, when a voltage is not being applied to the liquid crystal layer 108, the liquid crystal molecules 106 line up along the curved wall surfaces of the liquid crystal capsules 107, the optical path of the transmitted light thus meanders around, and incident light is scattered at boundary layers between the liquid crystal capsules 107 and the polymer film 105, and hence the liquid crystal layer 108 becomes cloudy. On the other hand, according to this light adjuster 103, when a voltage is applied to the liquid crystal layer 108, the liquid crystal molecules 106 line up along the direction of the electric field produced, and at this time, due to the liquid crystal layer 108 being made from a material such that the ordinary refractive index $n_o$ of the liquid crystal molecules 106 matches the refractive index $n_p$ of the polymer film 105, it becomes such that boundary layers between the liquid crystal capsules 107 and the polymer film 105 do not exist optically, and hence light incident on the liquid crystal layer 108 can be transmitted unhindered, whereby the liquid crystal layer 108 becomes transparent.

According to the light adjuster 103 of the present embodiment, since the connector 113 of the electrode structure that is connected to the lead line 114 which supplies power from an external source is formed of a copper tape, solder is not required, and further, heating is not required when securing the connector 113 to the lead line 114 and the metallic layer 112, whereby production of cadmium can be suppressed and degradation of the liquid crystal layer 108 can be prevented.

In the light adjuster 103 described above, the metallic layer 112 is formed of a copper tape. Therefore, the metallic layer 112 and the connector 113 can be made of the same material. Thus, the construction of the electrode structure can be made simple, whereby the labor time required to prepare the light adjuster 103 can be reduced.

Further, in the light adjuster 103 described above, the lead line 114 has an end thereof accommodated in the cylindrical sleeve 115 made of a metal. Therefore, it is possible to configure the surfaces of the parts of the lead line 114 and the connector 113 at which the lead line 114 and the connector 113 are connected together such that these parts can be smoothly connected. As a result, the bonding strength of the connector 113 is increased, and electrical conduction between the lead line 114 and the connector 113 can be reliably secured.

In the light adjuster 103 described above, the silver paste 111 is applied to the exposed part of the transparent electrically conductive film 110. However, the paste which is to be applied is not limited to this, and may be of any material which has electrical conductivity and can smooth the surface of the transparent electrically conductive film 110 when it hardens.

Further, with the light adjuster 103 described above, a copper tape (the metallic layer 112) is stuck on the silver paste 111. However, the material which is to be stuck on the silver paste 111 is not limited to this, and may be of any material which has electrical conductivity as well as adhesive strength, and may be, for example, a metal plate having electrical conductivity as well as adhesive strength.

Still further, with the light adjuster 103 described above, the connecting base is formed of the silver paste 111 and the metallic layer 112. However, there is no limitation on the number of members which form the connecting base, and for example, the connecting base may be formed of a single member which absorbs undulations of the surface of the transparent electrically conductive film 110 and has electrical conductivity.

Moreover, with the light adjuster 103 described above, the metallic layer 112 and the connector 113 of the electrode structure are made of separate members. However, the copper tape may be folded at a portion thereof between the metallic layer 112 and the intermediate layer 102*a* to thereby form the metallic layer 112 and the connector 113.

INDUSTRIAL APPLICABILITY

According to the light adjuster of the present invention, the connecting part that is connected to wiring to supply power from outside is formed of an electrically conductive tape. Therefore, solder is not required, and further, heating is not required when securing the connecting part to the wiring and the connecting base, whereby production of cadmium can be suppressed and degradation of the liquid crystal layer can be prevented.

Further, according to the light adjuster of the present invention, the connecting base has a metallic layer formed of an electrically conductive tape. Therefore, the construction of the electrode structure can be made simple, and thus, it is possible to reduce the labor time required to prepare the light adjuster.

According to the light adjuster of the present invention, the part of the wiring is accommodated in an electrically conductive cylindrical housing. Therefore, it is possible to configure the surfaces of the parts of the wiring and the electrically conductive tape at which the wiring and the electrically conductive tape are connected together such that these parts can be smoothly connected, whereby the bonding strength of the electrically conductive tape is increased, and electrical conduction between the wiring and the electrically conductive tape can be reliably secured.

The invention claimed is:

1. A light adjuster including:
   a liquid crystal layer having a plurality of voids therein, each of said voids being filled with a liquid crystal material;
   a pair of substrates that sandwich said liquid crystal layer therebetween, at least one of said substrates being transparent;
   transparent electrically conductive films provided on respective facing surfaces of said substrates; and
   an electrode structure formed of a connecting part connected to a wiring that supplies power from outside,
   wherein said connecting part is formed of an electrically conductive tape,
   wherein part of the wiring that connects to said electrically conductive tape is accommodated in an electrically conductive cylindrical housing, and
   wherein said electrically conductive tape has one end which is stuck on said cylindrical housing.

2. A light adjuster as claimed in claim 1, wherein
   said electrode structure further comprises a connecting base that is interposed between said connecting part and one of said transparent electrically conductive films, and
   said connecting base includes a metallic layer that is formed of said electrically conductive tape.

3. A light adjuster as claimed in claim 1, wherein said cylindrical housing is provided with a closed end.

4. A light adjuster as claimed in claim 1, wherein
   said electrically conductive tape is electrically connected to one of said transparent electrically conductive films without using solder, and
   said part of the wiring is electrically connected to said electrically conductive tape without using solder.

5. A laminated glass including:
   a pair of glass sheets disposed in facing relation to each other;
   intermediate layers provided on respective facing surfaces of said pair of glass sheets; and
   a light adjuster sandwiched between said intermediate layers, said light adjuster comprising:
   a liquid crystal layer having a plurality of voids therein, each of said voids being filled with a liquid crystal material;
   a pair of substrates that sandwich said liquid crystal layer therebetween, at least one of said substrates being transparent;
   transparent electrically conductive films provided on respective facing surfaces of said substrates; and
   an electrode structure formed of a connecting part connected to a wiring that supplies power from outside,
   wherein said connecting part is formed of an electrically conductive tape,
   wherein part of the wiring that connects to said electrically conductive tape is accommodated in an electrically conductive cylindrical housing, and
   wherein said electrically conductive tape has one end which is stuck on said cylindrical housing.

* * * * *

UNITED STATES PATENT AND TRADEMARK OFFICE
CERTIFICATE OF CORRECTION

PATENT NO. : 7,372,534 B2  Page 1 of 1
APPLICATION NO. : 11/118248
DATED : May 13, 2008
INVENTOR(S) : Yuichi Yano It is certified that error appears in the above-identified patent and that said Letters Patent is hereby corrected as shown below:

On the Title page add the following Item (63):

-- Related U.S. Application Data

(63) Continuation of application No. PCT/JP2004/011196, filed on July 29, 2004. --

Before column 1, line 6, which includes the heading "TECHNICAL FIELD", please insert the following:

-- This application is a continuation of application No. PCT/JP2004/011196, filed on July 29, 2004, which claims priority to Japanese Patent Application 2003-203468, filed on July 30, 2003. --

Signed and Sealed this

Twenty-first Day of July, 2009

JOHN DOLL
*Acting Director of the United States Patent and Trademark Office*